Figure 1:
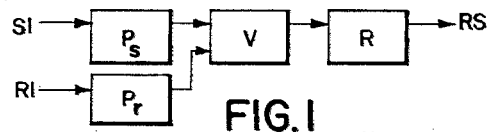

June 5, 1962      J. H. WESSELS      3,038,104

DEVICE FOR SYNCHRONIZING A ROTATORY SYSTEM

Filed March 3, 1959      2 Sheets-Sheet 1

INVENTOR
JOHANNES HENDRIK WESSELS

BY
AGENT

… … …

United States Patent Office 3,038,104
Patented June 5, 1962

3,038,104
DEVICE FOR SYNCHRONIZING A ROTATORY SYSTEM
Johannes Hendrik Wessels, Eindhoven, Netherlands, assignor to North American Philips Company, Inc., New York, N.Y., a corporation of Delaware
Filed Mar. 3, 1959, Ser. No. 796,819
Claims priority, application Netherlands Mar. 15, 1958
12 Claims. (Cl. 317—6)

The synchronization of electric motors or other rotatory systems with respect to a reference signal often poses a problem. For certain purposes, for example for recording pictures to be transmitted electrically and/or for reproducing recorded pictures, it is moreover necessary to maintain a given phase-ratio between the motion of the rotatory system and the reference signal.

The present invention concerns devices for maintaining the synchronization and the phase of a rotatory system with respect to a reference signal. Conventional devices designed for this purpose comprise a source of reference pulses derived from the reference signal, a generator, which is controlled by the rotatory system and produces a fixed number of control pulses per revolution of the rotatory system, a circuit arrangement for measuring the phase-difference between the reference pulses and the control pulses, which control pulses have substantially the same frequency on reaching the synchronous speed of rotation, and a regulating device which is controlled by this circuit arrangement and regulates the energy supplied to the rotatory system. For example, the source of reference pulses is a reference-oscillator delivering at regular intervals a fixed number of pulses per time unit, while the rotatory system delivers a fixed number of pulses per revolution, for example by means of a photocell. In a known form of such a device, the pulses delivered by the rotatory system control a saw-tooth generator which, on the appearance of each pulse, produces a saw-tooth pulse starting simultaneously with the corresponding pulse from the rotatory system.

In the synchronous condition, the generator, which is controlled by the rotatory system, and the source of reference pulses supply the same number of pulses per time unit, and the time interval between the control pulses and the corresponding reference pulses remains substantially constant. This interval, and consequently the mutual phase ratio, is measured, for example by testing and storing in a capacitor the level reached by the aforesaid saw-tooth pulses during the corresponding reference pulses. Finally, this time interval determines the torque driving the rotatory system so as to tend to maintain constant the phase between the control pulses and the reference pulses.

Conventional devices of the type referred to in the preamble do not operate before the frequency of the control pulses substantially stabilizes at a value practically equal to that of the frequency of the reference pulses. On starting up the rotatory system, its speed has consequently first to be very accurately given the correct value, mostly by means of a separate speed-control device. Not before the speed of the rotatory system assumes this highly critical substantially synchronous value does the device become operative for synchronizing and maintaining the phase. Such a separate speed-control device is expensive, complicates the device and increases its weight and bulk. During operation, it moreover suffers from the disadvantage of requiring frequent trimming.

The present invention has for its object to render superfluous a separate speed-control device for starting up the rotatory system. The device according to the invention has the feature that the aforesaid measuring circuit responds to a difference between the respective intervals between two successive control pulses and between two successive reference pulses and controls the regulating device so as to maintain the energy supplied to the rotatory system at a maximum starting value when the time interval between two successive control pulses exceeds the time interval between two successive reference pulses.

Hence, between the rotatory system and the regulating device there is, as it were, a slipping coupling neglecting any phase differences exceeding an interval between two successive reference pulses, so that the regulating device maintains the driving torque at a maximum value until the phase difference change from polarity, and mtaintains the driving torque at a minimum value until the time intervals between two successive control pulses again exceed those between two successive reference pulses, and the sign of the phase differences again changes. Inbetween, the driving torque is set to a value proportional to the phase difference between a reference pulse and the succeeding control pulse.

This measuring circuit preferably comprises a counter having at least three positions, which is moved to a higher counting position by each control pulse and to a lower counter counting position by each reference pulse, which counter controls the regulating device in such manner as to maintain the energy supplied to the rotatory system at its starting value until the counter reaches its third position and reduces the value of the supplied energy by an amount commensurate with the ratio between the time interval during which the counter is in a position higher than its second counting position and the time interval between two successive reference pulses.

Figure 2:
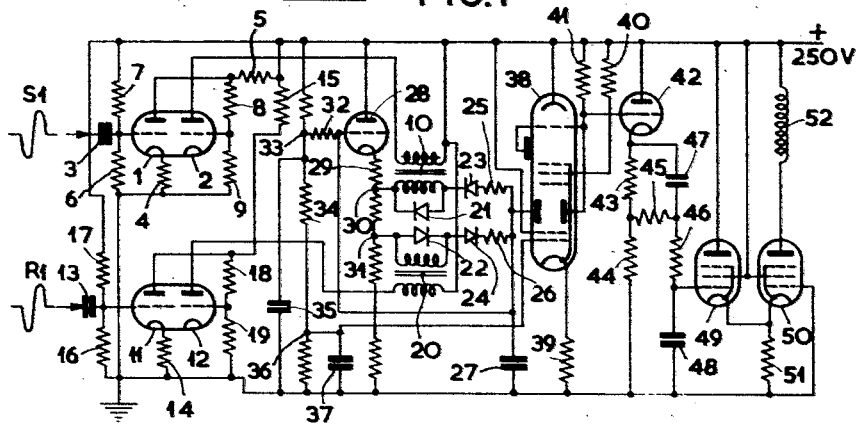
Figure 3:
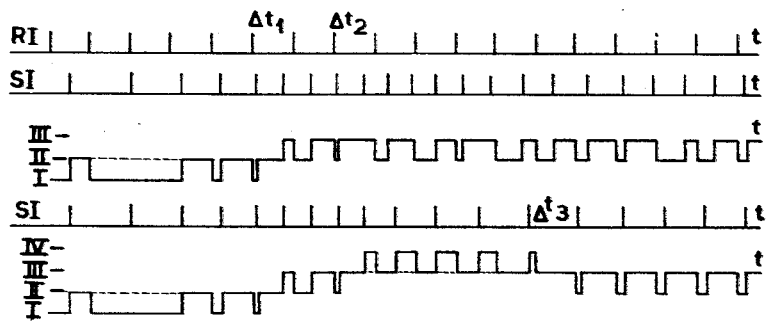
Figures 4, 5:
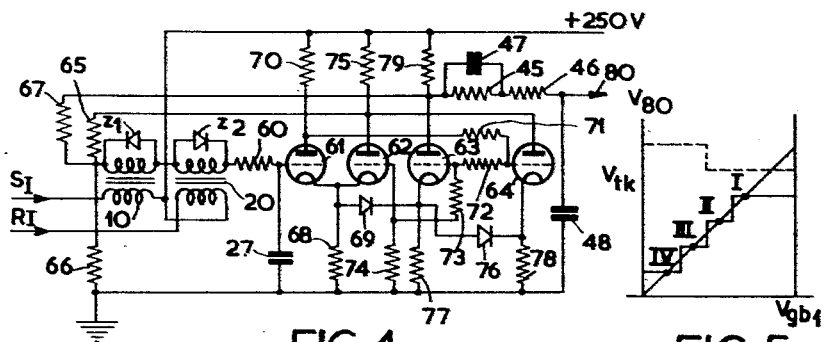
Figures 6, 8:
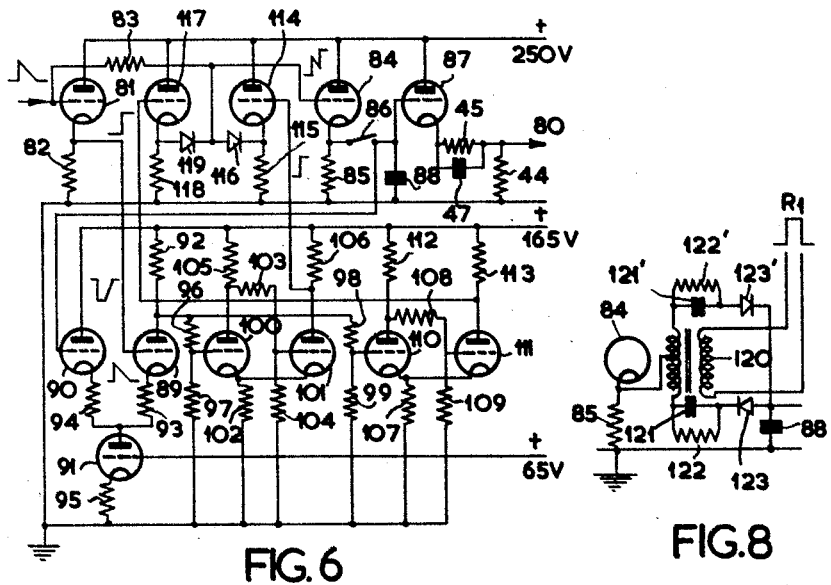
Figure 7:
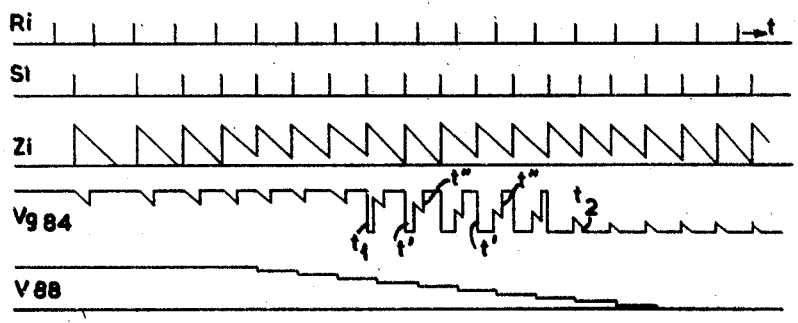

In order that the invention may be readily carried into effect, examples will now be described in detail with reference to the accompanying drawings, in which:

FIG. 1 shows in block-diagram of the device according to the invention,
FIG. 2 shows the circuit diagram of a first embodiment,
FIG. 3 shows pulse/time diagrams for explaining the operation of this embodiment,
FIG. 4 shows the diagram of a variant of the embodiment shown in FIG. 2,
FIG. 5 is a voltage diagram for explaining the operation of said embodiment and its variant,
FIG. 6 is a partial circuit diagram of another embodiment,
FIG. 7 shows pulse/time diagrams for explaining the operation of the embodiment shown in FIG. 6, and
FIG. 8 shows the circuit diagram of a detail of the third embodiment.

The block-diagram shown in FIG. 1 represents a device according to the invention. This device comprises a source $Pr$ of reference signal, from which reference pulses are derived, and a generator $Ps$ which is controlled by a rotatory system to be synchronized and produces a fixed number of control pulses per revolution of the rotatory system. The control of the generator $Ps$ is indicated by an arrow $S1$. The rotatory system delivers per revolution, for example, one pulse in the form of a photo-current which is supplied to the generator $Ps$ and controls it so as to produce a sharp and short control pulse of definite form and amplitude on the occurrence of each photo-current pulse. Similarly, the source $Pr$ of reference pulses is controlled by means of an oscillator or any other generator having a fixed oscillation-frequency, as indicated by an arrow $R1$.

Both the control pulses and the reference pulses are supplied to a circuit $V$ for measuring the phase difference between the reference pulses and the control pulses which have substantially the same frequency on reaching the synchronous speed of rotation. This circuit is moreover responsive to a difference between the respective time intervals between two successive control pulses and between two successive reference pulses. It controls a regulating device R so as to maintain the energy supplied to the rotatory system at a maximum starting value if the time interval between two successive control pulses exceeds the time interval between two successive reference pulses and to control this energy in accordance with the phase difference between the reference pulses and the control pulses when the speed of the rotatory system reaches its synchronous value and the control pulses practically have the same frequency as the reference pulses.

FIG. 2 shows the diagram of a first example of a device as shown in FIG. 1. At S1, control pulses from the rotatory system to be synchronized are applied to the grid of a triode 1 through a coupling capacitor 3. The triode 1 is one half of a duo-triode 1, 2. The cathodes of the triodes 1 and 2 are grounded through a common resistor 4, the anode of the triode 1 is connected to the positive terminal of a supply source of +250 v. through a load resistor 5 and its grid is connected to earth through a leakage resistor 6 and to +250 v. through a resistor 7 which, together with the resistor 6, constitutes a voltage divider. The grid of the triode 2 is coupled to the anode of the triode 1 through a voltage divider comprising resistors 8 and 9 of which is connected to earth at one end, while its anode is connected to +250 v. through the primary winding of a transformer 10. A feedback loop across the triodes 1 and 2 is closed by the common resistor 4 in the cathode circuit of these two triodes so that they constitute a bistable trigger circuit arrangement.

Each pulse of the control signal S1 from the rotatory system begins with a negative portion, terminates with a positive portion and controls the bistable trigger comprising the triodes 1 and 2 so as to produce a short control pulse through the winding of the transformer 10.

The reference signal is applied through a condensor 13 to the grid of a triode 11 which is coupled to a triode 12 by a common cathode resistor 14. The triodes 11 and 12 are the two halves of a duo-triode. The grid of the triode 11 is earthed through a leakage resistor 16 which, together with a resistor 17, constitutes a voltage divider, while its anode is connected to +250 v. via a load resistor 15. The grid of the triode 12 is coupled to the anode of the triode 11 by way of a voltage divider comprising resistors 18 and 19, while the anode of the triode 12 is connected to +250 v. via the primary winding of a transformer 20. Consequently, the triodes 11 and 12 also constitute a bistable trigger. Each pulse of the reference signal R1 likewise begins with a negative portion and terminates with a positive portion cutting off again the triode 12.

By means of the transformers 10 and 20 respectively negative and positive current pulses having a predetermined charge content are supplied to the control electrode of a measuring circuit. Across each of these secondary windings only a pulse of predetermined polarity is allowed to appear, since these secondary windings are shunted by rectifiers 21 and 22 respectively. The pulse of predetermined polarity produced across a secondary winding is transferred to a capacitor 27 via a rectifier 23 and 24 respectively polarized accordingly and series-connected resistors 25 and 26 respectively, in such a manner as to supply to the capacitor 27 a predetermined positive charge in response to one type of pulse and a predetermined negative charge in response to the other type of pulse. The circuits of the secondary windings of the transformers 10 and 20 are completed via the cathode circuit of a triode 28. This cathode circuit comprises an ohmic voltage divider 29 with tappings 30 and 31, to which the secondary windings of the transformers 10 and 20 are connected. The anode of the triode 28 is directly connected to +250 v., its grid being connected to the non-grounded terminal of the capacitor 27 and on the other hand, through a resistor 32, to a tapping 33 of an ohmic voltage divider 34 connected between +250 v. and earth. The tapping 33 is grounded via a capacitor 35, and the voltage divider 34 has a second tapping 36 grounded via a capacitor 37. The measuring circuit comprises, as a main constituent, a counter tube 38. This counter tube has at least four different conditions corresponding to counting values 0, 1, 2 and 3 and termed condition I, II, III and IV respectively. It comprises a cathode which, as well as two intermediate grids, is earthed via a resistor 39, a first control grid connected to the tapping 36, a first screen grid directly connected to +250 v., two deflecting electrodes, a second screen grid connected to +250 v. via a resistor 40, a screen- and beam-stabilization electrode connected to +250 v. via a load resistor 41 moreover feeding one of the deflecting electrodes, and an electrode provided with luminescent material which acts as a collector or anode and simultaneously as an indicating electrode and is directly connected to +250 v.

The grid of a triode 42 is connected to the common point of the screen- and stabilization electrode and of one of the deflecting electrodes. This triode is connected as a cathode-follower. Its anode is directly connected to +250 v. and its cathode circuit comprises two series-connected resistors 43 and 44. The grid of a pentode 49 is connected to the common point of these resistors through a separating resistor 45 and a series-connected resistor 46. A capacitor 47 shunts the resistors 43 and 45, while a resistor 48 is connected between the control grid of the pentode 49 and earth. A pentode 50 is coupled to the pentode 49 by a common cathode resistor 51. The anode of the pentode 49 is directly connected to +250 v., as the screen grids of the two pentodes 49 and 50. The control grid of the pentode 50 is directly earthed and the third grids of the two pentodes are connected to their respective cathodes. The pentodes 49 and 50 are power pentodes, for example of the type EL83, and the anode circuit of the pentode 50 comprises a winding 52 exerting a braking magnetic force on the rotatory system when the pentode 50 is conductive. However, this pentode is normally cut off by the voltage drop produced across the resistor 51 by the cathode current of the normally conductive pentode 49.

During starting of the rotatory system, the frequency of the resultant control pulses S1 is lower than that of the reference pulses R1, as shown on the left-hand part of the two upper lines in FIG. 3. As a result, the capacitor 27 is charged positively, since it receives more positive pulses produced across the secondary winding of the transformer 20 than negative pulses produced across the secondary winding of the transformer 10. The electron beam emitted by the cathode of the tube 38, controlled by the first grid of this tube and focussed by the two screen grids and by the two cathode-connected further grids thereof, is consequently deflected by the left-hand deflecting electrode to the left-hand side of the drawing so as to impinge on the left-hand part of the anode of this tube. Hence, the tube 38 remains in its condition I. During every pulse across the secondary winding of the transformer 10, however, the capacitor 27 is partially discharged by this pulse so that the left-hand deflecting electrode of the tube 38 temporarily becomes less positive during the time interval between a control pulse and the succeeding reference pulse, while the electron beam assumes a position corresponding to the condition II of the electron tube, as shown on the left-hand part of the third and fifth lines of FIG. 3. With an increase in speed of rotation of the rotatory system, the repetition frequency of the control pulses increases until it even slightly exceeds the frequency of the reference pulses, as shown in a strongly exaggerated manner on the central portion of the second line of FIG. 3. When two control pulses S1 appear between two successive reference pulses R1, as at the instant $\Delta t_1$ on the first and fourth lines of FIG. 3, the left-hand deflecting electrode temporarily becomes more negative so that the electron beam assumes the position III in the tube 38, as shown on the central portion of the third line of FIG. 3. During the next reference pulse R1, it resumes its position II, but no longer its position I. Subsequently, the time intervals during which the electron beam stays in its position III depend upon the phase difference between the reference pulses R1 and the control pulses S1. The current through the resistor 41, produced by electrons impinging on the screen- and stabilization electrode, increases with the position of the electron beam, so that the cathode current of the cathode-follower triode 42 varies accordingly and the control grid of the pentode 49 gradually becomes more negative. The cathode current of this pentode then decreases, whereas the cathode- and anode current of the pentode 50 increases and a braking current starts flowing through the winding 52.

The mechanical inertia of the rotatory system and/or the electric delay of the device may, however, be so large that the rotatory system exceeds the synchronization speed and two successive control pulses S1 again appear between two successive reference pulses R1, as at $\Delta t_2$ on the first and fourth lines of FIG. 3. As a result, the coupled phase-ratio between the rotatory system and the reference signal temporarily obtained is lost, so that the braking force exerted by means of the winding 52 and related to the time intervals during which the electron beam occupies its position III in the tube 38 decreases instead of increasing, and subsequently increases again as the phase difference increases, and so on, as shown on the right-hand part of the third line in FIG. 3. In other words, upon the second occurrence of two successive control pulses S1 between two successive reference pulses R1, the first of the control pulses brings the electron beam to position III. The second control pulse, however, does not affect the beam position, since only three beam positions are employed in this case, and consequently the next reference pulse returns the beam to position II in which no braking force is exerted. Thus, the braking force is released even though the repetition rate of the control pulses is greater than that of the reference pulses. This may sometimes be very objectionable since the rotatory system starts rotating at a fixed synchronous speed only comparatively late, or because this synchronous speed is no longer attainable after having been exceeded once or repeatedly. This is avoided by using the fourth position of the electron beam in the tube 38. The second time two successive control pulses appear between two successive reference pulses, as at $\Delta t_2$ on the fourth line of FIG. 3, the electron beam assumes this fourth position. Upon the next reference pulse it resumes its third position, but no longer assumes its second position until two reference pulses again appear between two successive control pulshes, as at the instant $\Delta t_3$ on the fourth line of FIG. 3. During the time the electron beam stays in either of its fourth and third positions, a maximum braking force is continuously exerted on the rotatory system by means of the winding 52, so that the rotatory system cannot possibly exceed a synchronous speed. On the other hand, the rotatory system is preferably not braked as long as the electron beam does not exceed its second position, so that the rotatory system starts with a maximum torque.

The electron beam in the tube 38 is stabilized in each of its positions as a result of the coupling between the right-hand deflecting electrode and the screen- and stabilization electrode. This electrode is provided with holes through which the electron beam travels to the anode so that, if a part of the electron beam does not pass through a hole corresponding to its position, this part is intercepted by the screen- and stabilization electrode. The voltage drop across the resistor 41 increases accordingly so that the potential of the right-hand deflecting electrode decreases. In accordance with the position assumed a greater part of the current of the electron beam is consequently intercepted by the screen- and stabilization electrode and the right-hand deflecting electrode assumes a lower potential. The unshunted cathode resistor 39 brings about a certain degree of negative feedback. On the other hand, the potential difference across the capacitor 27 is applied to the grid of the cathode follower comprising the triode 28, so that the potential of its cathode slightly exceeds that of the non-earthed electrode of the capacitor 27. Since the tappings 30 and 31, to which the secondary windings of the transformers 10 and 20 are connected at one end lie in the cathode circuit of the triode 28 a corresponding voltage is produced at these tappings by a source having a low internal resistance constituted by the triode 28. The diodes 23 and 24 are maintained cut off by these voltages, while the capacitor 27 is slowly charged or discharged through the voltage divider 34 and resistor 32 so that the potential of its non-earthed terminal invariably becomes again equal to that of the tapping 33, which lies between the rest-potential of the tapping 31 and the rest-potential of the tapping 30. The pulses transmitted through transformers 10, 20 and rectifiers and resistors 23 to 26 alter the charge of the capacitor 27 so that each pulse causes a jump of the electron beam from one position to an adjacent position in the tube 38. The potential of the right-hand deflecting electrode and of the beam-stabilization electrode gradually decreases with the potential of the non-earthed electrode of the capacitor 27 and of the left-hand deflecting electrode when this capacitor is discharged, and conversely.

The input circuit comprising the transformers 10, 20 and the counter tube 38 consequently constitutes a counter with self- stabilized positions, which is brought to a higher position by a first type of pulses and to a lower position by a second type of pulses. Pulses of one type supply a positive charge to the capacitor 27, while pulses of the other type supply a negative charge to this capacitor, a negative feedback providing that the counter stays in the correct position after leaking away of the last charge from this capacitor.

The voltage pulses across the output resistor 41 of the tube 38 are substantially smoothed by the smoothing network constituted by the resistor 46 and the capacitor 48, after the cathode-follower triode 42, functioning as a pulse source having a low internal resistance, has transferred these pulses to its cathode circuit.

The pulses S1 are produced by the rotatory system which is itself controlled by the device and, in particular, by means of the braking winding 52, so that the device together with the rotatory system constitutes a feedback system. In order to fulfill the stability desiderata required for such a feedback system, it should be prevented that the transmission via this system decreases by more than 12 db per octave as a function of the frequency, around the frequency at which the amplification of the system is equal to unity. A phase shift increasing with the frequency and a decrease in amplification are produced by the device, in particular by the capacitor 48 and the resistor 46. On the other hand, it is known that the mechanical inertia of a controlled system corresponds to a decrease in amplification increasing with the frequency over the system by 12 db per octave. Consequently, in order to fulfill said stability desiderata, an increase in amplification with the frequency around the frequency at which the overall amplification of the system is equal to unity is introduced into a part of the transmission circuit. This is realized in a simple manner by means of the capacitor 47 which, together with the resistors 43 to 45, constitutes a correction network, the transmission of which increases with the frequency within a given frequency range. The frequency transmission through the closed loop constituted by the rotatory system and the device shown in FIG. 2 corresponds, for example, to unity at a frequency of 10 c./s. The network comprising the capacitor 47 brings about a decrease in amplification drop between 3 and 30 c./s., and the capacitor 48 together with the resistor 46 increase this drop at frequencies exceeding 500 c./s., so that frequencies equal to or exceeding the repetition frequency of the reference pulses are considerably attenuated and the voltage across the capacitor 48 assumes an average value proportional to the phase difference between the reference pulses and the respective succeeding control pulses.

FIG. 4 shows a variant of the example shown in FIG. 2. In this variant, the counter tube 38 has been replaced by a counter comprising four triodes 61 to 64 which are intercoupled so as to jointly constitute a kind of trigger circuit having four stable positions. The rotatory system itself comprises a generator which is controlled by the rotatory motion and produces a fixed number of control pulses per revolution of the rotatory system, a source of reference signal directly supplying reference pulses. The control pulses S1 are supplied to the primary winding of the transformer 10, while the reference pulses R1 are supplied to the primary winding of the transformer 20. These two windings are connected at one end to the positive terminal of a source of high-voltage of 250 v., while their secondary windings are connected in series with each other in the grid circuit of the triode 61. Rectifiers 21 and 22 again shunt these secondary windings. The grid circuit of the triode 61 comprises the transverse capacitor 27 and a resistor 60 corresponding to resistors 25 and 26 shown in FIG. 2, while the end remote from the grid of the triode 61 of the secondary winding of the transformer 10 is connected to the tapping of a voltage divider comprising resistors 65 and 66. To the same tapping there is further connected a direct current feedback circuit comprising a series-resistor 67. The cathode of the triode 61 is directly connected to that of the triode 62 and is earthed through a resistor 68. It is moreover coupled via a rectifier 69 to the cathode of the triode 63. The anode of the triode 61 is connected to +250 v. via a load resistor 70 and is coupled to the grid of the triode 64 by a series-resistor 71, to the grid of the triode 63 by a second series-connected resistor 72 and to the grid of the triode 62 by a third resistor 73. The anode of the triode 62 is connected to +250 v. via a load resistor 75 and is moreover directly connected to the anode of the triode 64 and to that end of the resistor 65 remote from the tapping of the voltage divider, the other end of the voltage divider 65—66 being connected to earth. The grid of the triode 62 is likewise connected to earth via a leakage resistor 74 which, together with resistors 71 to 73, constitutes a voltage divider having three tappings. The cathode of the triode 63 is coupled to the cathode of the triode 64 via a rectifier 76, and these two cathodes are connected to earth through resistors 77 and 78 respectively. The anode of the triode 63 is connected to +250 v. via a load resistor 79. That end of the feedback resistor 67, which is remote from the tapping of the voltage divider 65, 66, is connected to the anode of the triode 63, as well as an output circuit comprising the smoothing capacitor 48, the series resistor 46 and a correcting network comprising the series resistor 45 shunted by the capacitor 47. That end of the smoothing capacitor 48, which is remote from an output terminal 80, is connected to earth.

The measuring circuit described may assume any of four different stable conditions. In a first stable condition the triode 61 is highly conductive, whereas the triodes 62 to 64 are non-conductive, hence the voltage drops across resistors 75 and 79 are small and the potential applied to the grid of the triode 61 via the secondary windings of transformers 10 and 20 and resistor 60 is comparatively high. Since the triode 61 is highly conductive, the potential at its anode is comparatively low, so that the potentials at the tappings of the voltage divider 71 to 74 are comparatively low and the triodes 62, 63 and 64 remain cut off by the voltage drop across resistor 68, since the cathodes of the triodes 63 and 64, due to the coupling to the cathodes of the triodes 61 and 62 via rectifier 69 and rectifiers 69 and 76 respectively are not allowed to become more negative than the said cathodes of the first two triodes 61 and 62.

A negative pulse applied to the grid of the triode 61 causes the circuit to assume a second stable condition in which the triode 61 is still comparatively highly conductive and the triode 64 is also conductive, while the triodes 62 and 63 are still cut off. In this second state, the triode 64 remains conductive, since the rectifier 76 is now cut off, and since its grid is connected to a tapping of the voltage divider 71, 74 and both the current and the voltage drop across the load resistor 70 of the triode 61 have decreased by approximately one-third of the maximum value. On the other hand, a voltage drop occurs across the load resistor 75 of the triodes 62 and 64, since the triode 64 is now conductive, so that the resultant potential at the tapping of the voltage divider 65 is reduced by a given amount.

A second negative pulse applied to the grid of the triode 61 brings the circuit into a third stable condition in which the triode 61 passes approximately only one-third of its maximum current, whereas the triodes 63 and 64 are conductive and the triode 62 still remains cut off. Also this condition is stable, since the rectifier 69 is then cut off and due to the feedback from the anode of the triode 63 to the grid of the triode 61 via resistor 67. The triode 63 becomes conductive since the rectifier 69 is cut off by the pulse and since the potential at the tapping of the voltage divider 71, 74 to which its grid is connected has increased beyond the cut-off value with respect to the potential of its cathode which, in turn, has dropped due to the decrease in cathode current of the triode 61. The cathode resistor 78 of the triode 64 is larger than the cathode resistor 77 of the triode 63, so that the triode 64 becomes conductive prior to the triode 63, the rectifier 76 being cut off as a result of the potential difference between the cathodes of these two triodes. The resistor 77 in turn exceeds, the cathode resistor 68 of the triodes 61 and 62, so that the rectifier 69 is also cut off when the triode 63 is conductive.

A third negative pulse applied to the grid of the triode 61 cuts off this triode completely, so that the voltage drop across the resistor 68 would become zero if the triode 62 did not become conductive. However, this triode also becomes conductive due to the momentary decrease of the voltage drop across the resistor 68 on the one hand and as a result of the further increase in potential at the corresponding tapping of the voltage divider 71, 74 on the other hand. This fourth condition is also stable due to the feedback between the anode of the triode 63 and the grid of the triode 61 via resistor 67 and as a result of the feedback from the anodes of the triodes 62 and 64 to the grid of the triode 61 via resistor 65.

FIG. 5 shows the feedback voltage $V_{tk}$ at the common point of the resistors 65, 66 and 67 as a function of the voltage at the grid of the triode 61, with the feedback circuit to this grid interrupted. It is seen that this feedback voltage has four stable conditions, each of which corresponds to a given range of grid voltages. As a result of the feedback through resistors 65 and 67 the grid potential of the triode 61 invariably assumes a value approximately midway of the corresponding range. On the other hand, the voltage $V_{80}$ set up at the output terminals 80 coupled to the anode of the triode 63 is allowed to change only between two values: a more positive value corresponding to conditions I and II of the circuit, in which this triode is cut off, and a less positive value corresponding to conditions III and IV of the circuit in which the triode 63 is conductive. The control voltage thus produced for a regulating device changes accordingly as may be seen from the bottom line of FIG. 3, the dash-lines being taken into consideration.

The control of the triodes 62, 63 and 64 might alternatively be effected only by the cathode current of the triode 61, since a decrease in voltage drop across resistor 68 first cuts off the rectifier 76 and subsequently the rectifier 69, the cathodes of the triodes 64, 63 and 62 then being momentarily brought to earth potential in this sequence. The positive feed back from the anode of the triode 61 via the voltage divider 71 to 74 to the respective grids of the triodes 64, 63 and 62 effects, however, swift transition of the circuit from any stable condition to a higher or lower position.

FIG. 6 shows a second embodiment of the device according to the invention. This example is on the one hand controlled by a saw-tooth control pulse which are derived from a control signal produced the rotatory system For example, control pulses S1 are used for synchronizing a saw-tooth generator with a sweep-period shorter than the time interval between two successive reference pulses or for tripping it back on each control pulse. The reference pulses derived, for example, from a signal produced by a stabilized oscillator, are used for momentarily closing a switch.

The saw-toothed control pulses are applied to the grid of a first cathode-follower triode 81, the anode of which is directly connected to the positive terminal of a voltage supply of 250 v., its cathode being connected to earth via a load resistor 82. They are also applied, via a separating resistor 83, to the grid of a cathode-follower triode 84, the cathode of which is connected to earth via a load resistor 85. This cathode is moreover connected to a contact of a scanning switch 86, the other contact of which is connected to the grid of a third cathode-follower triode 87. This grid is earthed via a capacitor 88, while the anodes of the triodes 84 and 87 are both directly connected to +250 v. The cathode circuit of the triode 87 comprises two series-connected resistors 45, 44 and a capacitor 47 which is connected in parallel with the resistor 45 and consitutes a correcting network. The cathode of triode 81 is directly connected to the grid of a triode 89, and the non-earthed terminal of capacitor 88 is directly connected to the grid of a triode 90. The triodes 89 and 90 together with a third triode 91 constitute a measuring circuit comparing the charge condition of the capacitor 88 to the instantaneous value of the voltage of the saw-toothed pulses. The anode of the triode 89 is connected to a terminal at +165 v. via a load resistor 92, the anode of the triode 90 is directly connected to +165 v. and the respective cathode circuits of these two triodes comprise cathode resistors 93 and 94 respectively in series with a common impedance made up of a resistor 95 one end of which is earthed and of the series-connected cathode-anode path of the triode 91, the grid of this triode being connected to a terminal at a potential of +65 v. The triode 90 constitutes a source having a low impedance for applying to the anode of the triode 91 a voltage proportional to that across the capacitor 88. By means of the triode 89 this voltage is compared with the instantaneous value of the saw-tooth pulses one of the voltages being applied to its cathode and the other to its grid. The sensitivity of the circuit comprising triodes 89, 90 and 91 is set in such manner that the triode 89 is fully driven by a comparatively small variation of the difference between the instantaneous value of the saw-tooth voltage and the voltage across the capacitor 88. Across the resistor 92 there is consequently produced a voltage which changes from a minimum value to a maximum value within a comparatively small fraction of the saw-tooth period, during which fraction the instantaneous value of the saw-tooth voltage is approximately equal to the capacitor voltage.

Between the anode of the triode 89 and earth there are connected two voltage dividers comprising resistors 96, 97 and 98, 99 respectively. The respective tappings of these voltage dividers are connected to the grids of triodes 100 and 110 respectively. The triode 100, together with a triode 101, constitutes a multivibrator controlling a first gate circuit, while the triode 110, together with a triode 111, constitutes a second multivibrator controlling a second gate circuit. The triodes 100 and 101 are intercoupled by a common cathode resistor 102; the feedback loop is closed since the grid of the triode 101 is coupled to the anode of the triode 100 via a voltage divider 103, 104. The anode circuits of these two triodes comprise load resistors 105 and 106 respectively connected to +165 v. The triodes 110 and 111 constitute a circuit which is substantially identical to that of the triodes 100 and 110 and comprises resistors 107, 108, 109, 112 and 113. The first gate circuit comprises a triode 114, the anode of which is connected to +250 v., while its cathode is connected to earth via a load resistor 115 and its grid is connected to the anode of the triode 101. It further comprises a rectifier 116, via which the grid of the triode 84 is connected to the cathode of the triode 114 when the potential at this cathode is lower than that at the grid of the triode 81. The second gate circuit comprises a triode 117, the anode of which is likewise at a potential of +250 v. and the cathode of which is connected to earth via a resistor 118. The grid of the triode 117 is directly connected to the anode of the triode 113 and its cathode is connected to the grid of the triode 84 via a rectifier 119, so that the potential of this grid is not allowed to drop below that of the cathode of the triode 117.

The scanning switch 86 is, for example, an electronic switch of conventional type, shown on FIG. 8, which is controlled by the reference pulses R1. This switch comprises a transformer 120 having a secondary winding, a center tapping of which is connected to the cathode of the triode 84 and the ends of which are connected to the non-earthed terminal of the capacitor 88 via capacitors 121 and 121' respectively shunted by resistors 122 and 122' respectively and via oppositely connected diodes 123 and 123' respectively. Each reference pulse R1 produces a current through the secondary winding of the transformer 120 and through the shunted capacitors and the diodes. After each pulse the diodes 123 and 123' are cut off by the charge of capacitors 121 and 121' respectively produced by said pulse. During the next following reference pulse, these capacitors have partially become discharged via resistors 122 and 122' respectively so that this pulse renders the diodes 123 and 123' conductive again. In this manner, during every reference pulse, the voltage across the capacitor 88 assumes the instantaneous value of the voltage across the capacitor 85, the capacitor 88 either being charged via the upper half of the secondary winding of the transformers 120, the networks 121', 122' and the diode 123' or being discharged via the diode 123, the network 121—122 and the lower half of the secondary winding.

The voltage dividers 96, 97 and 98, 99 as well as the cathode-coupling and load resistors of the triodes 100, 101, 110 and 111 are chosen to be such that the triode 100 of the first multivibrator becomes non-conductive on flyback of the saw-tooth pulse and again becomes conductive when the voltage on the anode of the triode 89 attains a value slightly below the value corresponding to the voltage across the capacitor 88, and that the triode 110 also becomes non-conductive on fly-back of the saw-tooth pulse and again becomes conductive when the voltage on the anode of the triode 89 reaches a value slightly exceeding that which corresponds to the voltage across the capacitor 88. When the triode 100 becomes conductive the triode 101 is cut off so that a comparatively high potential is applied to the grid of the triode 114. This triode then becomes conductive and the comparatively large voltage drop across its cathode resistor 115 cuts off the rectifier 116. Similarly, the triode 11 becomes non-conductive when the triode 110 becomes conductive, and the comparatively high voltage thus applied to the grid of the triode 117 renders this triode conductive. The voltage drop the cathode resistor 118 occasioned by the cathode current of the triode 117 polarizes the rectifier 119 in the conductive direction so that a voltage substantially corresponding to the potential of +165 v. at the anode of the triode 111 is set up at the grid of the triode 64 via this rectifier. Consequently, just before the flyback of the saw-tooth pulse, the grid of the triode 84 is at the potential of the cathode of the conductive triode 117 and on flyback its potential leaps to that of the cathode of the then non-conductive triode 114 of, say, approximately +125 v. Just before the decreasing sawtooth voltage becomes equal to the voltage across the capacitor 88, the rectifier 116 is cut off so that the potential of the grid of the triode 84 then assumes the instantaneous value of the saw-tooth voltage. Just after the saw-tooth voltage has dropped below the voltage across the capacitor 88, the rectifier 119 alternately becomes conductive again so that the potential at the grid of the triode 84 again increases to the value of approximately +165 v. of the cathode potential of the triode 117.

Such operation, however, postulates the switch 86 to be closed by the reference pulses at an instant between cut-off of the rectifier 116 and the rectifier 119 again becoming conductive. If it is closed earlier, the capacitor 88 is charged to a higher positive voltage, the cathode current of the triode 90 increases and that of the triode 89 decreases, while the "measuring range," in which the grid potential of the triode 84 follows the saw-tooth voltage, passes to higher saw-tooth voltages, or conversely. Since the sweep time of the saw-tooth is shorter than the time interval between two successive reference pulses, this range disappears completely if the speed of the rotatory system, for example on starting, is lower than the synchronous speed. With an increase in value of the voltage set up across the capacitor 88, the triode 100 is first no longer cut off so that the cathode of the triode 114 remains at approximately +165 v. and the potential of the grid of the triode 84 only follows the saw-tooth voltage between the flyback of the saw-tooth and the flipping over of the second multivibrator. Subsequently, also the triode 110 is no longer cut off and also the cathode of the triode 117 remains at approximately +165 v. so that also the grid of the triode 84 remains at this potential. If, contrarily thereto, the speed of the rotatory system exceeds the synchronous speed, the triodes 100 and 110 continuously remain cut off, so that the triodes 114 and 117 are also cut off and the potential of the grid of the triode 84 remains at approximately +125 v.

Due to the non-negligible natural resistances of the sources of potential of +165 v. and of +125 v., constituted by the rectifiers 119 and 116 respectively in series with the cathode circuit of the triodes 117 and 114 respectively, the potential of the grid of the triode 84 does however not remain constant, neither in one nor in the other of the two extreme regulating conditions just described, but it slightly decreases or increases respectively after or prior to each flyback of the saw-tooth voltage respectively. If a reference pulse coincides in time with one of these comparatively small saw-tooth peaks, the voltage across the capacitor 88 slightly decreases or increases respectively. Thus, the average regulating voltage set up at the output terminals 80 is provisionally influenced only to a very small extent, the driving torque accordingly being slightly reduced or increased respectively. If this happens whilst the rotatory system attains the synchronous speed, the next following reference pulse again coincides in time with the next following saw-tooth peak. If the speed of the rotatory system is slightly higher or lower respectively than the synchronous speed, the potential sensed by means of the switch 86 at the instant of this second reference pulse is still a little lower or higher respectively. This potential controls also the triode 90 which becomes more conductive or less conductive respectively, so that the multivibrators comprising triodes 100, 101 and 110, 111 respectively become operative after a few successive reference pulses coinciding in time with saw-tooth peaks. The device "responds" and, from then onward, the switch 86 senses the voltage across the resistor 85 between the instant at which the triode 114 becomes conductive and the instant at which the triode 117 becomes non-conductive. This voltage corresponds to the value of the saw-tooth voltage at a given instant of the sweep of the saw-tooth, which instant varies with the phase ratio of the reference pulses relatively to the saw-tooth pulses, so that the voltage at the terminals of the capacior 88 and at the output terminals 80 slides, as it were, downwardly or upwardly respectively along the saw-tooth edge corresponding to the stroke period and dwells at a value just sufficient for the driving torque controlled by the voltage across the terminals 80 to keep the rotatory system going at the synchronous speed.

The diagram of FIG. 7 shows the reference pulses $Ri$, control pulses $Si$, saw-tooth pulses $Zi$ derived therefrom, the various forms of the voltage $V_{g84}$ on the grid of the triode 84 and the voltage $V_{88}$ across the capacitor 88. The conditions at too low a speed of the rotatory system (on starting), at the synchronous speed and at too high a speed of the rotatory system are shown from left to right. At the instant $t1$ the triodes 100, 110, 114 and 117 are cut off for the first time, at the instants $t'$ and $t''$ respectively the triodes 100, 114 and 110, 117 respectively each time become conductive, and finally the triodes 100, 110, 114 and 117 remain cut off from the instant $t2$ onward.

The devices as described greatly facilitate synchronization of a rotatory system, since they moreover cause the rotatory system to assume the correct speed and subsequently synchronize it automatically at the frequency of the reference pulses and hold it in a given phase-ratio with regard to these pulses upon the rotatory system reaching the synchronous speed. Consequently, synchronization is obtained in a minimum of time without passing over from one condition of operation to another condition of operation.

The embodiments shown on FIGS. 2 or 4, in which the measuring circuit comprising a counter, proved to be particularly advantageous in practice. The counter tube 38 shown on FIG. 2 moreover indicates whether or not the synchronization device responds: below the synchronous speed, it dwells in its first or second condition, above this speed it dwells in its third or fourth condition. Of course, for example in the device shown on FIG. 4, transistors may be substituted for valves.

What is claimed is:

1. A device for synchronizing and maintaining the phase of a rotatory system by means of a reference signal, comprising a source of reference pulses derived from the reference signal, a generator coupled to said rotatory system for providing a fixed number of control pulses per revolution of the rotatory system, a circuit for measuring the phase difference between said reference pulses and said control pulses, said control pulses having substantially the same frequency as said reference pulses at the synchronous speed of rotation of said rotatory system, and a regulating device which is controlled by said circuit for regulating the energy supplied to said rotatory system, said measuring circuit being responsive to a difference between the respective intervals between two successive control pulses and between two successive reference pulses, and being connected to control said regulating device to maintain the energy supplied to the rotatory system at a maximum starting value until two successive control pulses reach the measuring circuit between two successive reference pulses.

2. A device for synchronizing and maintaining the phase of a rotatory system by means of a reference signal, comprising a source of reference pulses derived from the reference signal, a generator coupled to said rotatory system for providing a fixed number of control pulses per revolution of the rotatory system, a circuit for measuring the phase difference between said reference pulses and said control pulses, said control pulses having substantially the same frequency as said reference pulses at the synchronous speed of rotation of said rotatory system, and a regulating device which is controlled by said circuit for regulating the energy supplied to said rotatory system, said measuring circuit being responsive to a difference between the respective intervals between two successive control pulses and between two successive reference pulses, and being connected to control said regulating device to maintain the energy supplied to the rotatory system at a maximum starting value until two successive control pulses reach the measuring circuit between two successive reference pulses, said measuring circuit comprising a counter having at least three positions and adapted to be brought to a higher counting position by each control pulse and to a lower counting position by each reference pulse, said counter being connected to control the regulating device so as to maintain the energy supplied to the rotatory system at its starting value until the counter reaches its third position, and to decrease the value of the supplied energy by an amount commensurate with the ratio between the time interval during which the counter is in a position higher than its second counting position and the time interval between two successive reference pulses.

3. A device as claimed in claim 2, in which the counter has a fourth counting position and is adapted to control the regulating device so as to maintain the energy supplied to the rotatory system at a minimium value when said counter is in either of its third and fourth counting positions.

4. A device as claimed in claim 2, in which said counter comprises at least three directly intercoupled amplifier elements, a first of which is controlled in a first direction by the control pulses and in the opposite direction by the reference pulses, said first element being conductive alone in a first position and a number of the remaining amplifier elements related to the actual position of the counter being conductive in the remaining positions of the counter.

5. A device as claimed in claim 2, in which the measuring circuit comprises an input integrating network and feedback means for restoring the voltage across the transverse element of this network to a rest value after each reference and control pulse.

6. A device as claimed in claim 5, in which said counter comprises a cathode-ray counter tube comprising two deflecting electrodes and a beam-stabilization electrode by means of which the cathode beam can be stabilized in any one of at least three positions, the control pulses being supplied with a first polarity and the reference pulses being supplied with the opposite polarity to one of the deflecting electrodes, and a voltage produced across a common supply resistor for the other deflecting electrode and for the beam-stabilization electrode serving for controlling the regulating device.

7. A device as claimed in claim 5, in which the measuring circuit is connected to control the regulating device so as to maintain the energy supplied to the rotatory system at a minimum value when two successive control pulses repeatedly reach the measuring circuit between two successive reference pulses and until two successive reference pulses reach the measuring circuit between two successive control pulses.

8. A device as claimed in claim 7, in which the counter has a fourth counting position and is adapted to control the regulating device so as to maintain the energy supplied to the rotatory system at a minimum value when said counter is in either of its third and fourth counting positions.

9. A device for synchronizing and maintaining the phase of a rotatory system by means of a reference signal, comprising a source of reference pulses derived from the reference signal, a generator coupled to said rotatory system for providing a fixed number of control pulses per revolution of the rotatory system, a circuit for measuring the phase difference between said reference pulses and said control pulses, said control pulses having substantially the same frequency as said reference pulses at the synchronous speed of rotation of said rotatory system, and a regulating device which is controlled by said circuit for regulating the energy supplied to said rotatory system, said measuring circuit being responsive to a difference between the respective intervals between two successive control pulses and between two successive reference pulses, and being connected to control said regulating device to maintain the energy supplied to the rotatory system at a maximum starting value until two successive control pulses reach the measuring circuit between two successive reference pulses, said measuring circuit being adapted to control the regulating device so as to maintain the energy supplied to the rotatory system at a minimum value when two successive control pulses repeatedly reach the measuring circuit between two successive reference pulses and until two successive reference pulses reach the measuring circuit between two successive control pulses.

10. A device as claimed in claim 9, in which said measuring circuit comprises a sawtooth generator adapted for converting the control pulses into sawtooth pulses having a sweep period shorter than the time interval between two successive reference pulses, a switch is controlled by the reference pulses and arranged for charging a capacitor during each reference pulse, to a control voltage depending upon the instantaneous value of the sawtooth voltage of the sawtooth generator, and a difference stage is controlled by the sawtooth voltage and by the voltage across said capacitor and provided for comparing said capacitor voltage and said sawtooth voltage to each other.

11. A device as claimed in claim 10, in which the difference stage is arranged to control two triggers for tripping one of them over when the instantaneous value of the sawtooth voltage exceeds the value of the capacitor voltage by a first given amount, and for tripping the other over when the instantaneous value of the sawtooth voltage is smaller than the value of the capacitor voltage by a second given amount, said triggers being provided with respective gate circuits by way of which said triggers maintain the voltage applied to the capacitor during the reference pulses at a first starting value when the corresponding instantaneous value of the sawtooth voltage is smaller than the value of the capacitor voltage less said second given amount and at a second value when the corresponding instantaneous value of the sawtooth voltage exceeds the value of the capacitor voltage plus said first given amount, said capacitor being charged by a voltage corresponding to the instantaneous value of the sawtooth voltage when said instantaneous value lies between the capacitor voltage less the second amount and the capacitor voltage plus the first amount.

12. A device for synchronizing and maintaining the phase of a rotatory system by means of a reference signal, comprising a source of reference pulses derived from the reference signal, a generator coupled to said rotatory system for providing a fixed number of control pulses per revolution of the rotatory system, a circuit for measuring the phase difference between said reference pulses and said control pulses, said control pulses having substantially the same frequency as said reference pulses at the synchronous speed of rotation of said rotatory system, and a regulating device which is controlled by said circuit for regulating the energy supplied to said rotatory system, said measuring circuit being responsive to a difference between the respective intervals between two successive control pulses and between two successive reference pulses, and being connected to control said regulating device to maintain the energy supplied to the rotatory system at a maximum starting value until two successive control pulses reach the measuring circuit between two successive reference pulses, the measuring circuit comprising a network, the transmission of which increases with the frequency within a given frequency range so as to maintain the decrease in amplification of the device with increasing frequency lower than 12 db per octave around the frequency at which the loop amplification of the device and of the rotatory system is equal to unity.

References Cited in the file of this patent

UNITED STATES PATENTS

| | | |
|---|---|---|
| 2,551,306 | Wisman | May 1, 1951 |
| 2,878,427 | Best | Mar. 17, 1959 |